Jan. 5, 1965 J. W. ROWLAND 3,163,942
PREDICTION GAGE

Filed Jan. 26, 1959 5 Sheets-Sheet 1

INVENTOR.
JAMES W. ROWLAND
BY
*Whittemore, Hulbert & Belknap*
ATTORNEYS

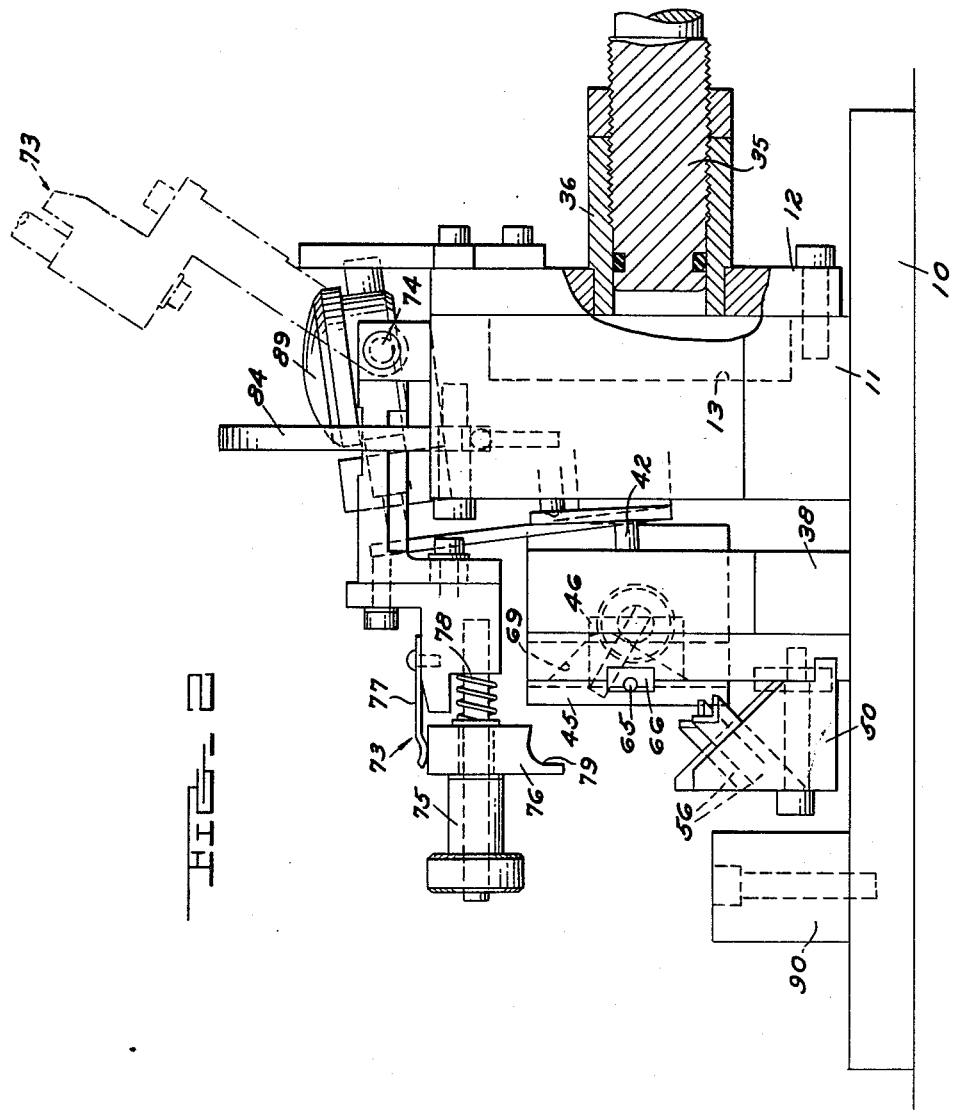

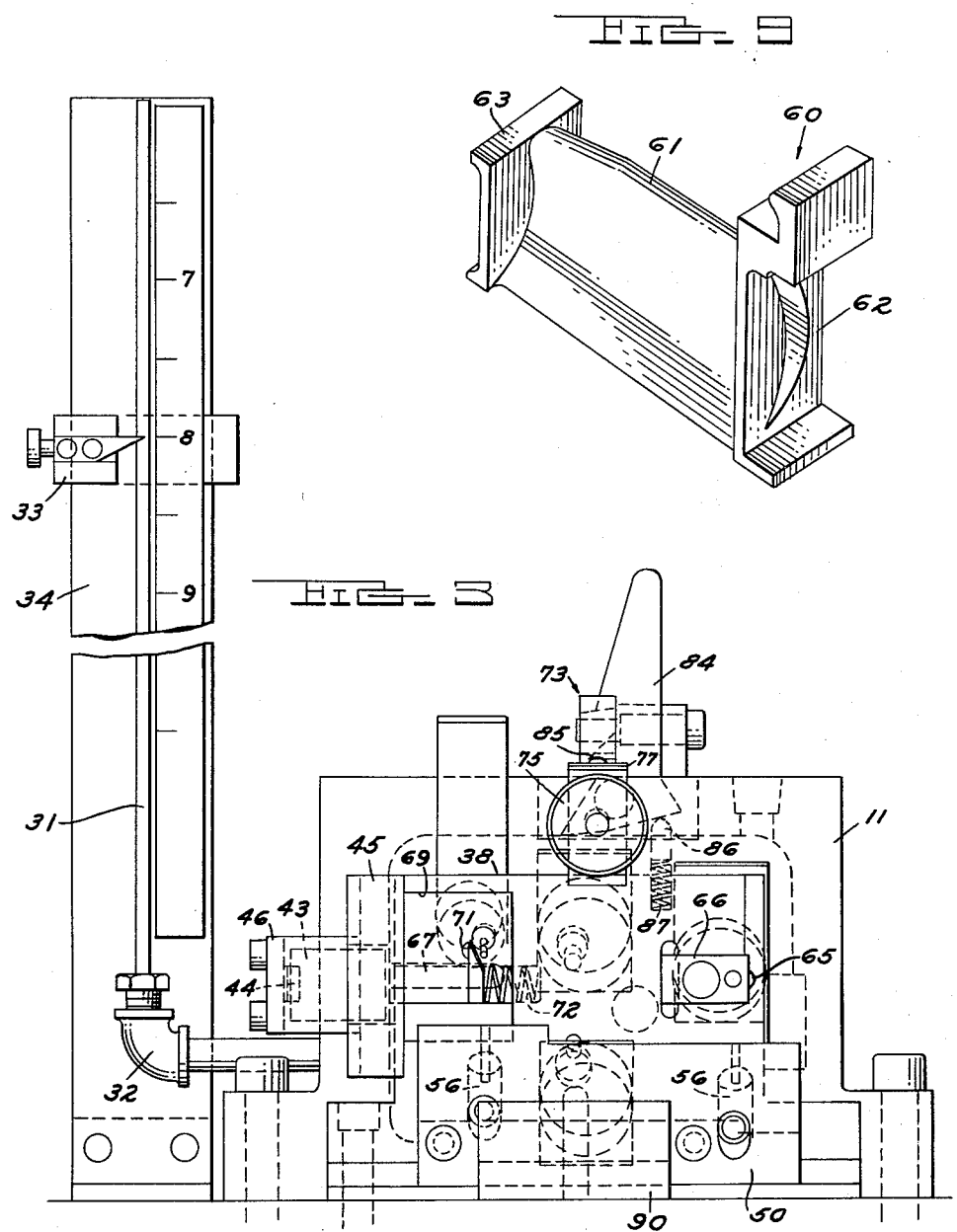

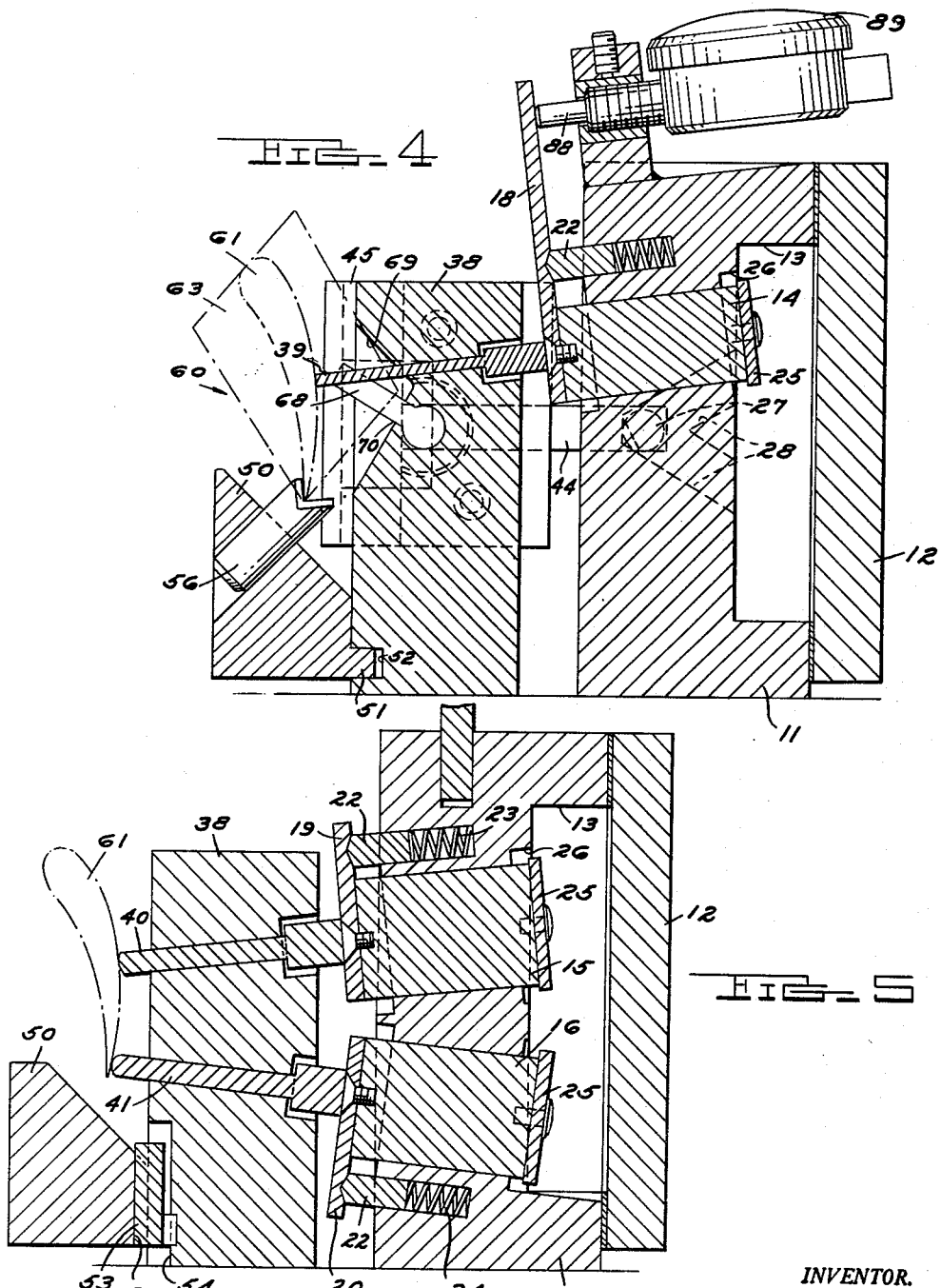

Jan. 5, 1965   J. W. ROWLAND   3,163,942
PREDICTION GAGE
Filed Jan. 26, 1959   5 Sheets-Sheet 5
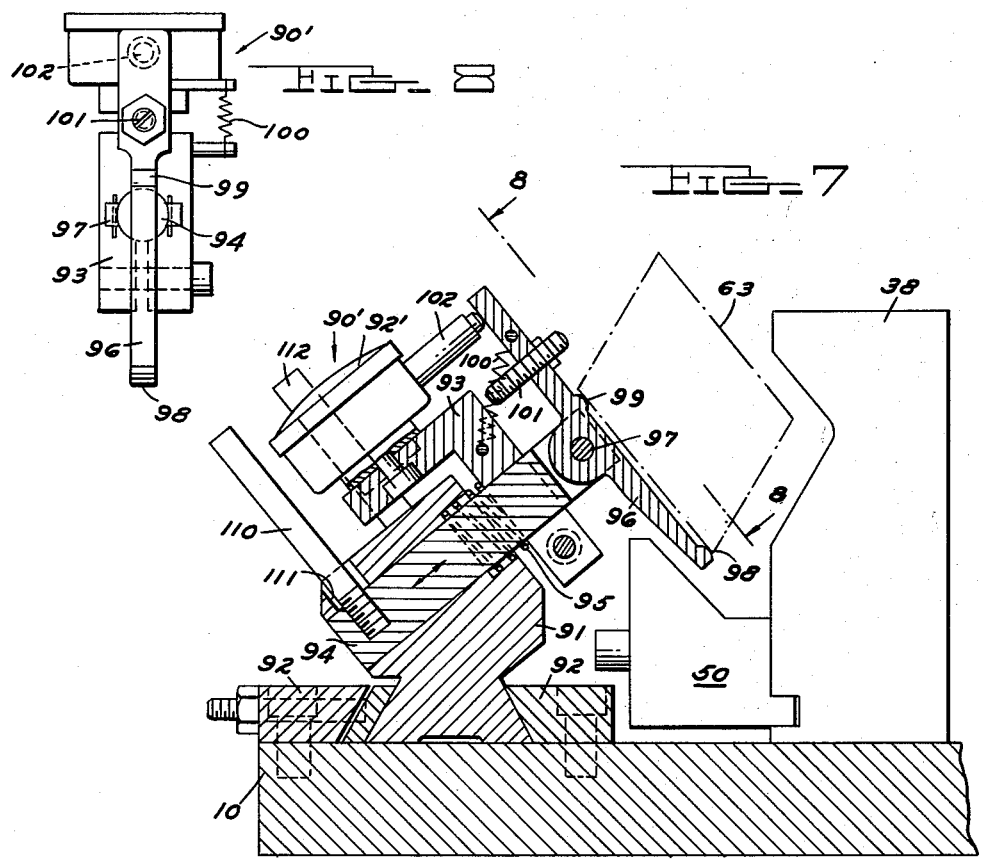
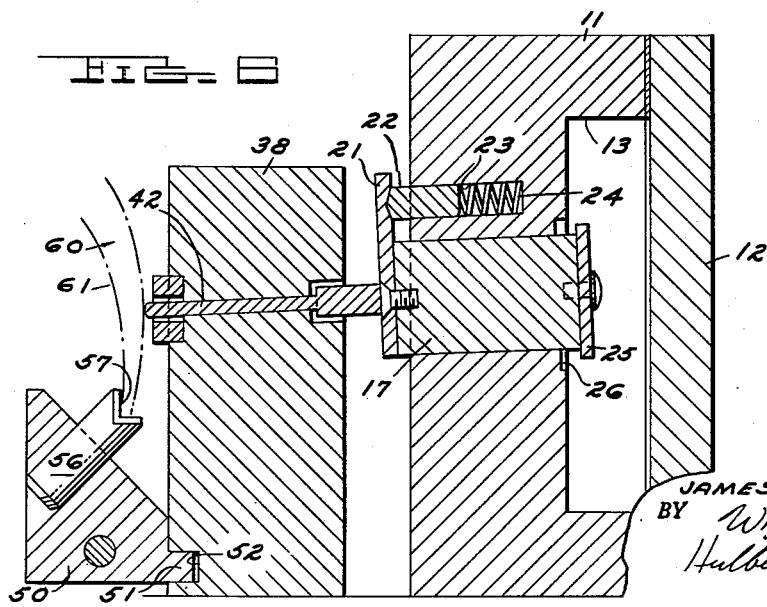
INVENTOR.
JAMES W. ROWLAND
BY Whittemore,
Hulbert & Belknap
ATTORNEYS 3,163,942
PREDICTION GAGE
James W. Rowland, Jackson County, Mich., assignor to Kelsey-Hayes Company, Detroit, Mich., a corporation of Delaware
Filed Jan. 26, 1959, Ser. No. 788,994
2 Claims. (Cl. 33—174)

This invention relates to gages and refers more particularly to a gage for determining certain characteristics of a workpiece.

The invention has for one of its objects to provide a gage for predicting certain characteristics of a workpiece prior to machining.

The invention has for another of its objects to provide a gage for classifying workpieces according to certain characteristics after machining.

The invention has for a further object to provide a gage to facilitate properly locating a workpiece for machining.

The invention has for still another object to provide a gage for measuring certain characteristics of a workpiece by fluid displacement.

The invention has for a still further object to provide means for simultaneously gaging or measuring selected different portions of the workpiece by plungers operating in a common fluid chamber, thereby totalling all of the individual readings and providing a single direct computation based on fluid displacement.

The invention has for another object to provide a gage as described in the preceding paragraph having a separate gaging device operated by one of the plungers for determining the position of the workpiece relative to its support.

Other objects and features of the invention will become apparent as the description proceeds, especially when taken in conjunction with the accompanying drawings illustrating a preferred embodiment of the invention, wherein:

FIG. 2 is a side elevation of the gage shown in FIG. 1, partly in section.

FIG. 3 is a front elevation of the gage.

FIG. 4 is a sectional view on the line 4—4 of FIG. 1.

FIG. 5 is a sectional view on the line 5—5 of FIG. 1.

FIG. 6 is a sectional view on the line 6—6 of FIG. 1.

FIG. 7 is a sectional view on the line 7—7 of FIG. 1.

FIG. 8 is a fragmentary elevation of a portion of FIG. 7, on the line 8—8 thereof.

FIG. 9 is a perspective view of a vane.

Figure 1:
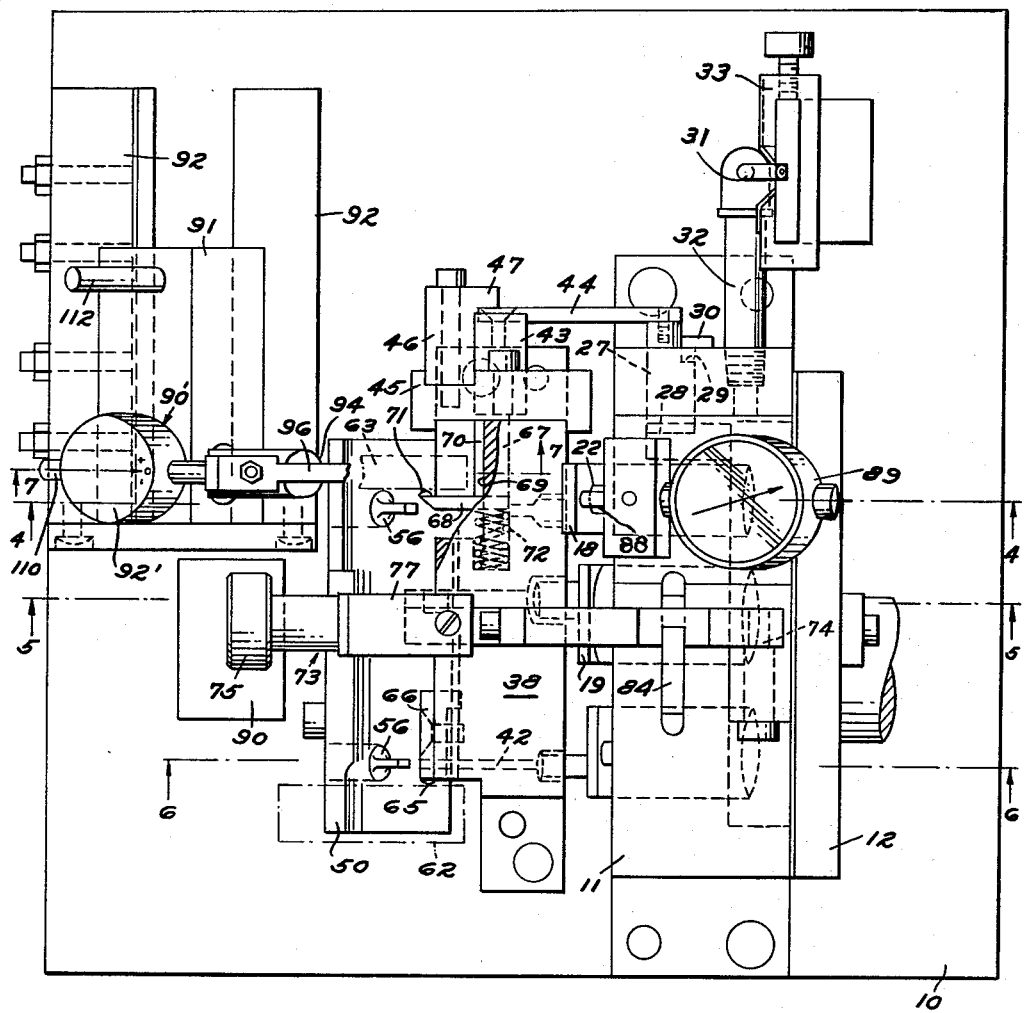
FIG. 1 is a top plan view of a prediction gage embodying the invention.

The gage of the present invention is particularly designed for the measurement of the airflow potentialities and characteristics of turbine vanes or blades employed in modern aircraft engine construction. More particularly, the gage is designed (1) to measure or predict the airflow potentialities of each blade prior to machining; (2) to locate the part properly for machining; and (3) to classify or select parts having certain characteristics after final machining. Turbine blade specifications require that measurements be made at several points on the airfoil section to determine the airflow classification of the part, and with each measurement having a plus or minus value this requires lengthy calculation by ordinary means to determine the sum total or value of all measursements necessary to classify the part.

According to the present invention, the various measurements are taken at the specified points on the airfoil by means of hydraulic plungers connected to a common hydraulic fluid chamber or reservoir, and the position of the plungers determines the amount of hydraulic fluid displaced from the chamber into a graduated glass tube and hence the level of fluid therein. By regulating the size of the respective plungers, it is unnecessary to make calculations in the ordinary way and instead the classification may be determined at once from the level of fluid displaced in the graduated tube. Hence a great deal of the calculations previously required are avoided.

Referring now more particularly to the drawings, the gage comprises a base 10 and a casing 11 mounted on the base. The rear wall 12 is removable and is securely clamped to the casing to define a chamber or reservoir 13 for hydraulic fluid. A plurality of plungers 14, 15, 16 and 17 are slidably supported in passages in the front wall of the casing. Plates 18, 19, 20 and 21 are secured to the front ends of the respective plungers and carry the pistons 22 which are slidably received in the bores 23 in the front wall of the casing. Springs 24 are compressed between the closed ends of the bores and the associated pistons for retracting the plungers 14–17, that is urging the forwardly to a limit determined by the engagement of disks 25 secured to the rear ends of the plungers with the recess portions 26 in the front wall of the chamber. Another plunger 27 is slidable in a passage in the side wall of the casing and communicates with the chamber by way of the bores 28 extending from the plunger passage to the chamber. Plunger 27 has a recess on one side defining a shoulder 29 engageable with a stop 30 secured to the casing to limit outward movement of the plunger. Hydraulic fluid in the chamber is displaced by the plungers and the displaced fluid rises in a glass tube or column 31 communicating at its lower end with the chamber by means of a fitting 32. A vertically adjustable marker 33 is clamped upon a scale 34 opposite the column which is graduated as indicated in FIG. 3. The level of fluid in the column or tube 31 may be initially adjusted by the plunger 35 threaded in a sleeve 36 communicating with the chamber. Rotation of the plunger causes it to move axially to displaced fluid as desired.

A guide block 38 is mounted on the base in front of casing 11 and is formed with passages for slidably receiving the plunger extensions 39, 40, 41 and 42 of the respective plungers 14–17. The guide block is also formed with a passage in a side wall for receiving the transversely extending piston 43 connected to the transverse plunger 27 by a plate 44. The member 45 secured to the guide block carries an abutment member 46 having a shoulder 47 providing an abutment limiting outward movement of the plunger 27 and piston 43 by engagement with the plate 44.

A vane support 50 is provided, formed with a rib 51 engageable in a transverse groove 52 in the front of the guide block to carry the vane support, and a locating pin 53 is disposed within a vertical recess 54 in the guide block and enters a notch 55 in the support to locate the latter transversely. A pair of laterally spaced support plugs 56 are secured to the support 50 and are provided with notched upper ends 57 for engaging an edge of the airfoil section of the vane. The vane is shown in schematic outline in several figures of the drawing and is designated 60. The vane has the airfoil section 61 and the enlarged supporting ends 62 and 63. The vane is positively supported at three points on the gage, namely, the notches 57 of the support plugs which engage the lower edge of the airfoil section 63 and the pin 65 which engages the inner surface of end 62 to locate the vane laterally. (See FIG. 1.) Pin 65 is formed on the member 66 carried by the guide block. When thus supported, the front ends of the plunger extensions 39–42 are engageable with selected portions of the airfoil. The inner end of the piston 43 has a reduced end 67 formed with a lateral extension 68 which extends into a recess 69 in the guide block through an elongated slot 70 therein.

The extension 68 has a pin 71 engageable with the inner surface of vane end 63 (see FIG. 1). A spring 72 compressed in the bore receiving piston end 67 normally urges the latter outwardly or to the left in FIG. 3.

A clamping arm 73 is pivoted to the casing for swinging movement about the horizontal axis of pin 74 and is provided for clamping the vane in adjusted angular position on the support plugs 56. The clamp has an adjusting screw 75 at the front end and a clamp part 76 is supported on the screw in a manner such that the screw can rotate relative to the clamp part but the screw and clamp part cannot move axially relative to each other. The clamp part 76 is held against rotation by the spring 77 secured to the body portion of the clamp. A compression spring 78 encircles the screw and is compressed between the body portion of the clamp and the clamp part. The underside of the clamp part is formed with a recess 79 for engaging the airfoil section of the vane.

The clamp is held down by a latch 84 pivoted to the casing for swinging movement from the operative position illustrated in FIG. 3 in which the notch portion 85 thereof engages over the clamp to hold it down, to a retracted position releasing clamp. A plunger 86 is slidable in the casing and is normally urged by compression spring 87 in an upward direction to rock the latch toward its operative position.

The plate 18 associated with the plunger 14 has a vertical extension engageable with the operating plunger 88 of a gage 89.

In use, a master gage part (not shown) is inserted in the gage and located and supported by the notches 57 of the plugs 56 and the fixed pin 65. The master block 90 provides a rest for the master gage part. The master gage part is adapted to engage the master block 90 to determine its angular position relative to the support plugs and thereby establish the level of displacement in the fluid column. By manipulation of the manual plunger 35, the fluid in the column may be regulated to a level corresponding to the number 8 on the graduated scale to indicate that Class 8 vanes are desired. Other master blocks are available for other classes of vanes. With the master gage part in position, the mechanical gage 89 is set to zero and the master part removed.

Thereupon an unmachined vane is inserted in the gage with its airfoil section supported on the notches 57 of the spaced plugs 56 and with one end portion 62 engaging the fixed pin 65. Then the clamp is swung down to engage the airfoil section of the vane and the screw 75 rotated to angularly position the airfoil section so that the plungers 14–17 and 27 will displace fluid from the chamber into the column to the level of the master gage part indicated at 8 on the graduated scale. The mechanical gage is read and the reading marked on the vane so that the vane can be positioned in a loading fixture in the same angular relation as in the prediction gage for machining of the ends.

After the ends are machined, the vane is returned to the prediction gage for a final classification. The ends must be carefully machined since the shape of the ends determines the angular position of the airfoil when assembled in the turbine, and hence the vane classification. If the previous steps have been properly carried out, the vane will classify as a Class 8 vane as predicted. The vane is again inserted in the gage and supported on the plugs 56 and by locater pin 65. The angular position of the vane for final classification is determined by the gage device 90'. The device 90' comprises a holder 91 supported on the base for sliding movement between the guides 92. The gage device includes a gage 92' having a body portion 93 secured to a slide 94 which is reciprocable in the holder but normally urged in a rearward direction to its operative position adjacent the vane on the support by the compression spring 95 encircling the slide and compressed between the body portion of the gage and the bottom of a counterbore of the passage supporting the slide. On the rear end of the slide is a lever 96 disposed in a vertical plane and pivoted on the horizontal pin 97. The lever has the projections 98 and 99 respectively above and below the pivot axis and engageable with the machined end 62 of the vane. The lever is normally urged in a counterclockwise direction by the tension spring 100 connected to the upper end portion of the lever and the body portion of the gage and is limited in its counterclockwise movement by a stop pin 101 engageable with the body portion. The upper end of the lever is engageable with the operating stem 102 of the gage 92'. The spring 95 normally urges the gage toward the workpiece for engagement therewith and the angular position of the lever determines the gage reading. The vane is angularly positioned by the clamp 73 to obtain a zero reading on gage 92' whereupon the scale opposite the glass tube 31 is read for classification of the vane. Depending upon the care with which the various steps of the operation have been taken, the vane should classify as a Class 8 vane as predicted, according to the level of fluid in tube 31. However if the level of fluid should indicate a Class 7 vane, then the vane is so classified. The slide 94 may be retracted away from the vane by the handle 110 projecting from the slide through an elongated slot 111 in the holder, and the entire gage 90' may be moved laterally (upwardly in FIG. 1) by handle 112 to clear the vane during the initial predicting part of the procedure.

The gage 92' is initially set by the master gage part previously referred to.

What I claim as my invention is:

1. A gage comprising a support for rockably supporting a workpiece, a casing having a chamber therein for hydraulic fluid, a plurality of spaced axially reciprocable plungers sildably supported on said casing and extending into said chamber to displace the hydraulic fluid therein, all of said plungers except one being directly engageable with spaced portions of a workpiece on said support, a piston connected to the said one of said plungers in spaced parallel relation thereto, said piston having contact means engageable with another portion of the workpiece on said support, said plungers being of predetermined different diameters depending on the portions of the workpiece to be engaged thereby so that certain plungers displace more fluid than others for a given axial movement thereof, means for measuring the volume of hydraulic fluid displaced by all of said plungers including a fluid column communicating with said chamber to receive the displaced hydraulic fluid, a guide block having passages slidably receiving and axially guiding said piston and all of said plungers except the said one thereof, spring means urging all of said plungers except the said one thereof in a direction for engagement with the workpiece on said support, spring means urging said one plunger in a direction for engagement of said contact means with the workpiece on said support, means for angularly moving the workpiece on said support and for fixing the same in adjusted position including a clamping arm pivoted on said casing having a longitudinally adjustable workpiece engaging part thereon, threaded means on said clamping arm for longitudinally adjusting said part, and a mechanical gage operated by the axial movement of one of said plungers to indicate the angular position of the workpiece.

2. A gage comprising a support for rockably supporting a workpiece, a casing having a chamber therein for hydraulic fluid, a plurality of spaced axially reciprocable plungers slidably supported on said casing and extending into said chamber to displace the hydraulic fluid therein, all of said plungers except one being directly engageable with spaced portions of a workpiece on said support, a piston connected to the said one of said plungers in spaced parallel relation thereto, said piston having contact means engageable with another portion of the workpiece on said support, said plungers being of predetermined different diameters depending on the portions of the workpiece to be engaged thereby so that certain plungers displace more fluid than others for a given axial movement thereof, means for measuring the volume of hydraulic fluid displaced by all of said plungers including a fluid column communicating with said chamber to receive the displaced hydraulic fluid, a guide block having passages slidably receiving and axially guiding said piston and all of said plungers except the said one thereof, spring means urging all of said plungers except the said one thereof in a direction for engagement with the workpiece on said support, spring means urging said one plunger in a direction for engagement of said contact means with the workpiece on said support, means for angularly moving the workpiece on said support and for fixing the same in adjusted position including a clamping arm pivoted on said casing having a longitudinally adjustable workpiece engaging part thereon, and threaded means on said clamping arm for longitudinally adjusting said part.

References Cited in the file of this patent
UNITED STATES PATENTS

| | | |
|---|---|---|
| 1,845,437 | Parkhurst | Feb. 16, 1932 |
| 2,028,503 | Doherty | Jan. 21, 1936 |
| 2,153,534 | Faught | Apr. 11, 1939 |
| 2,311,804 | Wright | Feb. 23, 1943 |
| 2,517,667 | Holkenbrink | Aug. 8, 1950 |
| 2,520,934 | Hoy | Sept. 5, 1950 |
| 2,638,680 | Baker | May 19, 1953 |
| 2,835,983 | Razdow | May 27, 1958 |
| 2,839,836 | Fuller | June 24, 1958 |
| 2,858,615 | Aller | Nov. 4, 1958 |
| 3,115,711 | Plante | Dec. 31, 1963 |